(12) United States Patent
Takamatsu et al.

(10) Patent No.: US 7,365,927 B2
(45) Date of Patent: Apr. 29, 2008

(54) ECCENTRICITY CORRECTION DATA RECORDING METHOD AND RECORDING MEDIUM HAVING ECCENTRICITY CORRECTION DATA

(75) Inventors: Kohei Takamatsu, Kawasaki (JP); Yoshiyuki Kagami, Kawasaki (JP); Shuichi Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/784,666

(22) Filed: Feb. 23, 2004

(65) Prior Publication Data
US 2005/0057837 A1 Mar. 17, 2005

(30) Foreign Application Priority Data
Sep. 17, 2003 (JP) ............................. 2003-324736

(51) Int. Cl.
*G11B 5/09* (2006.01)
(52) U.S. Cl. ..................... 360/48; 360/77.04
(58) Field of Classification Search ................ 360/48, 360/77.04–77.02
See application file for complete search history.

(56) References Cited

U.S. PATENT DOCUMENTS 6,493,173 B1 * 12/2002 Kim et al. ............... 360/77.04
2001/0030828 A1 * 10/2001 Takaishi ................... 360/78.14
2002/0126412 A1 * 9/2002 Shibata ..................... 360/77.04
2002/0196576 A1 * 12/2002 Hirano et al. ............. 360/77.07

FOREIGN PATENT DOCUMENTS

| JP | 08-063916 | 3/1996 |
|----|-----------|--------|
| JP | 09-035225 | 2/1997 |
| JP | 09-091903 | 4/1997 |
| JP | 09-128915 | 5/1997 |
| JP | 11-232810 | 8/1999 |
| JP | 2001-195196 | 7/2001 |
| JP | 2002-352535 | 12/2002 |

* cited by examiner

*Primary Examiner*—Craig A. Renner
*Assistant Examiner*—Varsha A. Kapadia
(74) *Attorney, Agent, or Firm*—Greer, Burns & Crain, Ltd.

(57) ABSTRACT

An eccentricity correction data recording method, a disk-shaped recording medium, a head position control method and an information recording and reproducing apparatus are disclosed for effective eccentricity correction on cylinders of a disk-shaped recording medium. The eccentricity correction data recording method is for position control over a recording and reproducing head on a disk-shaped recording medium having at least one user data recording area to record user data, the method including the step of recording the eccentricity correction data in a user data recording area.

12 Claims, 12 Drawing Sheets

ECCENTRICITY CORRECTION DATA RECORDING METHOD AND RECORDING MEDIUM HAVING ECCENTRICITY CORRECTION DATA

CROSS-REFERENCE TO RELATED APPLICATIONS

The present application is based on Japanese priority application No. 2003-324736 filed Sep. 17, 2003, the entire contents of which are hereby incorporated by reference.

BACKGROUND OF THE INVENTION

1. Field of the Invention

The present invention generally relates to a method of recording eccentricity correction data in a disk-shaped recording medium, a recording medium in which eccentricity correction data are recorded in accordance with the recording method, a method of controlling a head position based on the eccentricity correction data, and an information recording and reproducing apparatus, and more particularly to a method of recording eccentricity correction data in a disk-shaped recording medium in which eccentricity correction can be efficiently controlled, a recording medium in which eccentricity correction data are recorded in accordance with the recording method, a method of controlling a head position by using the eccentricity correction data, and an information recording and reproducing apparatus.

2. Description of the Related Art

For a recording apparatus using a disk-shaped recording medium, such as a hard disk drive apparatus, there is a demand of shortening the track pitch of the disk-shaped recording medium for the purpose of improving the recording density. As the track pitch is shortened, an allowable amount of off-track slice is made smaller, resulting in more significant errors of eccentricity. This eccentricity is caused by so-called "repeatable runout (RRO)" due to decentering of the center axis of the recording medium at servo track write (STW) time before shipment of the disk drive apparatus and at medium loading time into the disk drive apparatus.

In order to make the eccentricity smaller, for example, the following process is performed at an earlier step of an examination process before the shipment. First, in order to detect an amount of eccentricity correction, a digital signal processor (DSP) of a disk drive apparatus is used to perform discrete Fourier transform (DFT) on position data obtained through servo demodulation for a certain cylinder of a medium. The detected eccentricity correction amount is stored in a memory of DSP as an eccentricity correction table. Furthermore, the eccentricity correction table is stored in a flash ROM (Read Only Memory). At time of the next activation, the eccentricity correction table is read from the flash ROM and transferred to the DSP memory. Based on the eccentricity correction table, DSP controls eccentricity correction. As a result, it is possible to make an on-track operation stable throughout all cylinders for each recording and reproducing head.

Such cylinder/track eccentricity of a disk-shaped recording medium includes many order components (frequency components) from various factors. For low-order eccentricity data such as the first-order and the second-order components, even if a seek operation is performed toward a cylinder adjacent to a currently on-tracked cylinder, the phase component of the eccentricity data hardly changes. For high-order eccentricity data greater than or equal to the fourth order, however, if an on-tracked cylinder is shifted into the adjacent cylinder thereof, the phase component of the eccentricity data substantially changes (See FIG. 1 and FIG. 2). In such a case where the phase component of eccentricity changes, there is a risk that the eccentricity cannot be corrected at appropriate timing with respect to control operations. In this case, a current suitable to control the position of a recording and reproducing head cannot be supplied to a voice coil motor (VCM). As a result, the eccentricity correction cannot be properly controlled, thereby increasing RRO. Thus, it may be difficult to make the recording and reproducing head stationary on a certain cylinder.

In order to address the above-mentioned problem, DSP computes a difference between an initial low-order eccentricity in an initial eccentricity correction table and the currently detected corresponding order eccentricity together with a high-order eccentricity correction amount in real-time during an on-track operation (See FIG. 3).

Japanese Laid-Open Patent Applications No. 09-091903, No. 2001-195196, No. 11-232810, No. 2002-352535, No. 08-063916 and No. 09-128915 describe the related art.

In the above-mentioned method, however, the following problem may occur during seek operations to shift the recording and reproducing head from the cylinder, on which the head remains stationary, to another cylinder or immediately after seek operations including head switch operations. Namely, there arises a difference between high-order eccentricity data of a cylinder on-tracked by the recording and reproducing head previously, which are recorded for each recording and reproducing head by DSP, and actual eccentricity of a currently on-tracked cylinder. As a result, since the head positions cannot be controlled stably, there is a risk that a write operation may fail even if a seek operation is completed.

FIG. 1 and FIG. 2 are diagrams illustrating exemplary eccentricity data of cylinders of a disk-shaped recording medium after shipment. As shown in FIG. 1, phase differences between adjacent cylinders are small with respect to the low-order components (the first-order through the third-order components). However, as shown in FIG. 2, phase differences between adjacent cylinders are considerable with respect to high-order components (the 16th-order through the 18th-order components).

FIG. 3 shows an exemplary eccentricity correction step in a sequential read operation executed by a conventional disk drive apparatus.

Referring to FIG. 3, when a seek instruction is provided to DSP of the disk drive apparatus at step S1, DSP executes the seek instruction at step S2. At step S3, DSP reads an initial eccentricity correction table as described above as soon as the seek operation is completed. Then, DSP performs an eccentricity correction control operation based on the initial eccentricity correction table. Here, HDC does not start to read and write data until the eccentricity correction control operation becomes able to stably control head positions (steps S4 and S5).

In order to ensure that the recording and reproducing head can be positioned on an intended cylinder and the recording and reproducing head can be made stationary there, it is necessary to provide an initial eccentricity correction table specific to each cylinder and each recording and reproducing head and then position the recording and reproducing head precisely based on the initial eccentricity correction table.

In accordance with the above-mentioned Japanese Laid-Open Patent Application No. 09-091903, eccentricity correction data are written in servo information recorded in a medium in advance. In the disclosed method, whenever the servo information on the medium is read, an optimal amount of eccentricity correction is determined for a current position, and an eccentricity correction operation is optimally controlled at the current on-track position. However, according to the disclosed method, since the correction control data are written together with the servo information on the medium, it is necessary to provide a hardware device to write the correction control data. In addition, since the eccentricity correction data are written immediately after the servo information, there is a risk that the servo information may be erroneously overwritten due to rotational variations of the medium and an instable stationary status of the writing head during write operations.

Also, it is preferable to prepare eccentricity data with respect to all orders corresponding to the number of heads for each cylinder as initial eccentricity correction amounts so as to position the heads on target tracks stably. From the viewpoint of the size of an available memory, however, it is difficult to store such all-order eccentricity data on a large number of cylinders, for example, more than 10000 cylinders, for each disk drive apparatus into a flash ROM. In one approach to address the problem, a medium is divided, for example, into four areas between the outer circumferential area and the center area. For each area, one cylinder is selected, and initial low-order eccentricity correction amounts (for example, the first-order and the second-order components) are provided. Then, when data are recorded or reproduced in/from the medium, DSP performs a real-time eccentricity correction operation on all cylinders in the above-mentioned fashion.

SUMMARY OF THE INVENTION

It is a general object of the present invention to provide an eccentricity correction data recording method, a disk-shaped recording medium, a head position control method, and an information recording and reproducing apparatus in which one or more of the above-mentioned problems are eliminated.

A more specific object of the present invention is to provide an eccentricity correction data recording method, a disk-shaped recording medium, a head position control method, and an information recording and reproducing apparatus in which an initial eccentricity correction table corresponding to each cylinder of a disk-shaped recording medium and recording and reproducing heads is recorded as normal data (different from servo information) in a user area of the disk-shaped recording medium, thereby effectively reducing operation steps executed by MCU (Microprocessor Unit) and DSP (Digital Signal Processor) and realizing not only stable head position control during sequential write operation but also quick recovery through effective retry operation in response to detection of off-track errors during write operation.

In order to achieve the above-mentioned objects, there is provided according to one aspect of the present invention a method of recording eccentricity correction data for position control over a recording and reproducing head on a disk-shaped recording medium having at least one user data recording area to record user data, the method including the step of: recording the eccentricity correction data in a user data recording area.

In an embodiment of the present invention, the eccentricity correction data may be recorded for each cylinder, and the eccentricity correction data may include at least one of eccentricity correction data on the cylinder and eccentricity correction data on a next cylinder recorded next to the cylinder in accordance with a sequential recording manner.

Additionally, there is provided according to another aspect of the present invention a disk-shaped recording medium having at least one user data recording area to record user data, including: eccentricity correction data being recorded in a user data recording area.

Additionally, there is provided according to another aspect of the present invention a method of controlling a position of a recording and reproducing head on a disk-shaped recording medium having at least one user data recording area to record user data, the method including the step of: controlling the position of the recording and reproducing head based on eccentricity correction data recorded in a user data recording area.

Additionally, there is provided according to another aspect of the present invention an information recording and reproducing apparatus, including: a disk-shaped recording medium having at least one user data recording area to record user data, the disk-shaped recording medium including eccentricity correction data being recorded in a user data recording area.

According to one aspect of the present invention, eccentricity correction data, which is used to control the position of a recording and reproducing head on a disk-shaped recording medium, are recorded in a user data recording area to record user data rather than a predefined recording area to record servo information, that is, another control information for positioning the recording and reproducing head.

In this fashion, since such eccentricity correction data on a cylinder and a head are collectively recorded not in a servo information recording area but in a user data recording area, it is possible to use a hardware item for writing user data to write the eccentricity correction data without additionally providing any special-purpose hardware item for writing the eccentricity correction data. Accordingly, the eccentricity correction data can be efficiently written. In addition, it is possible to prevent servo information from being erroneously overwritten during writing of the eccentricity correction data. Furthermore, if an error correction code (ECC) is added to the eccentricity correction data in the same way as writing of user data, it is possible to make the eccentricity correction data more reliable.

Additionally, according to one aspect of the present invention, the eccentricity correction data are written in the same way as writing of user data. Thus, the write operation to record the eccentricity correction data can be modified by using existing write programs for writing user data. For example, in order to make the write operation suitable for a sequential write function, the write operation can be modified to write, in addition to writing of eccentricity correction data on a target cylinder in the target cylinder, eccentricity correction data on a next cylinder accessed next to the target cylinder in accordance with a sequential write procedure. In this case, since eccentricity correction operation is ready to be controllable in advance after seek operation, it is possible to improve the operation speed.

Other objects, features and advantages of the present invention will become more apparent from the following detailed description when read in conjunction with the accompanying drawings.

DETAILED DESCRIPTION OF THE PREFERRED EMBODIMENTS

Figure 1:
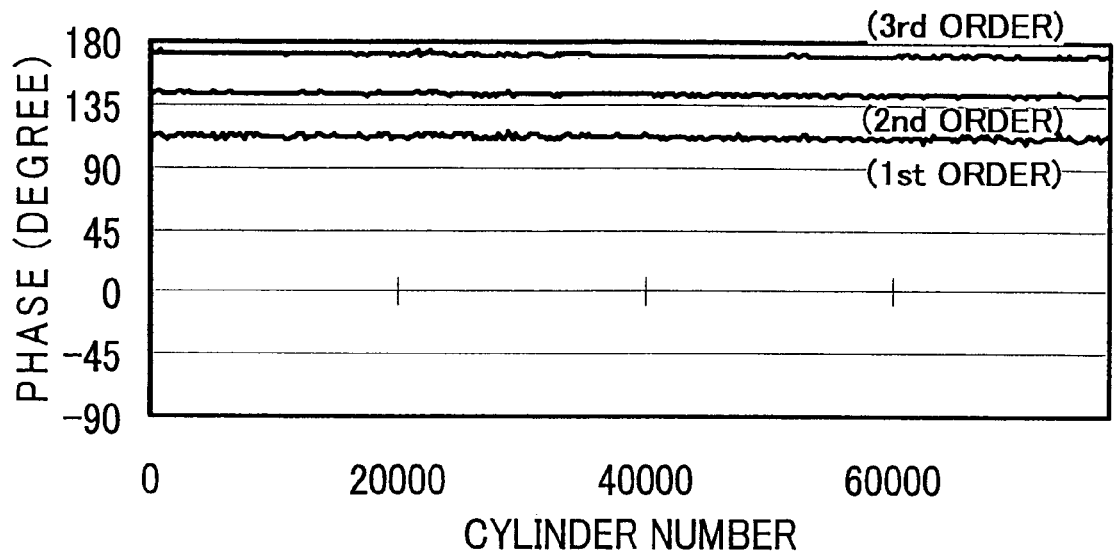
FIG. 1 is a diagram illustrating exemplary low-order eccentricity data of a cylinder of a conventional disk-shaped recording medium.
Figure 2:
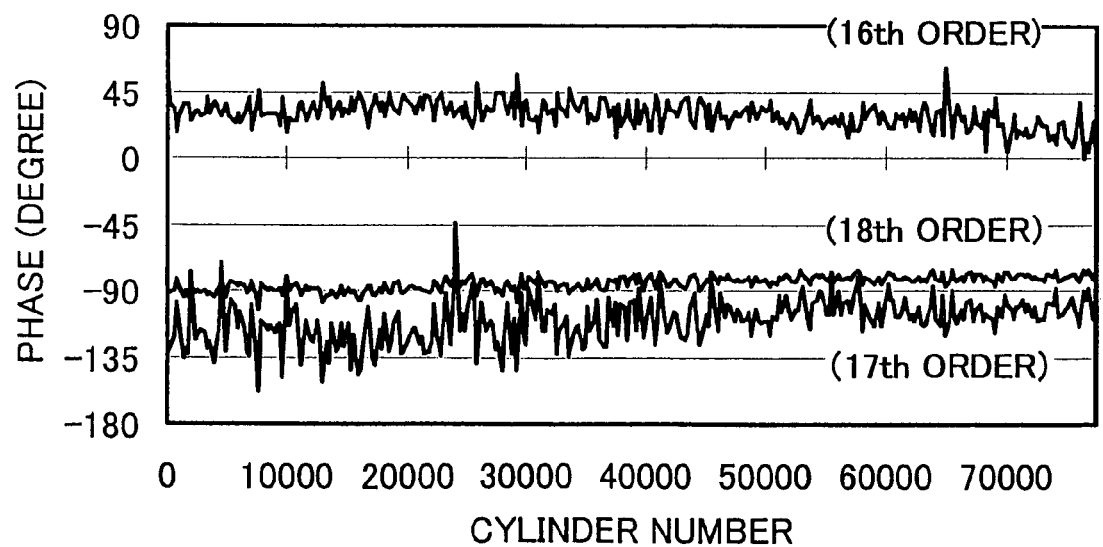
FIG. 2 is a diagram illustrating exemplary high-order eccentricity data of a cylinder of a conventional disk-shaped recording medium.
Figure 3:
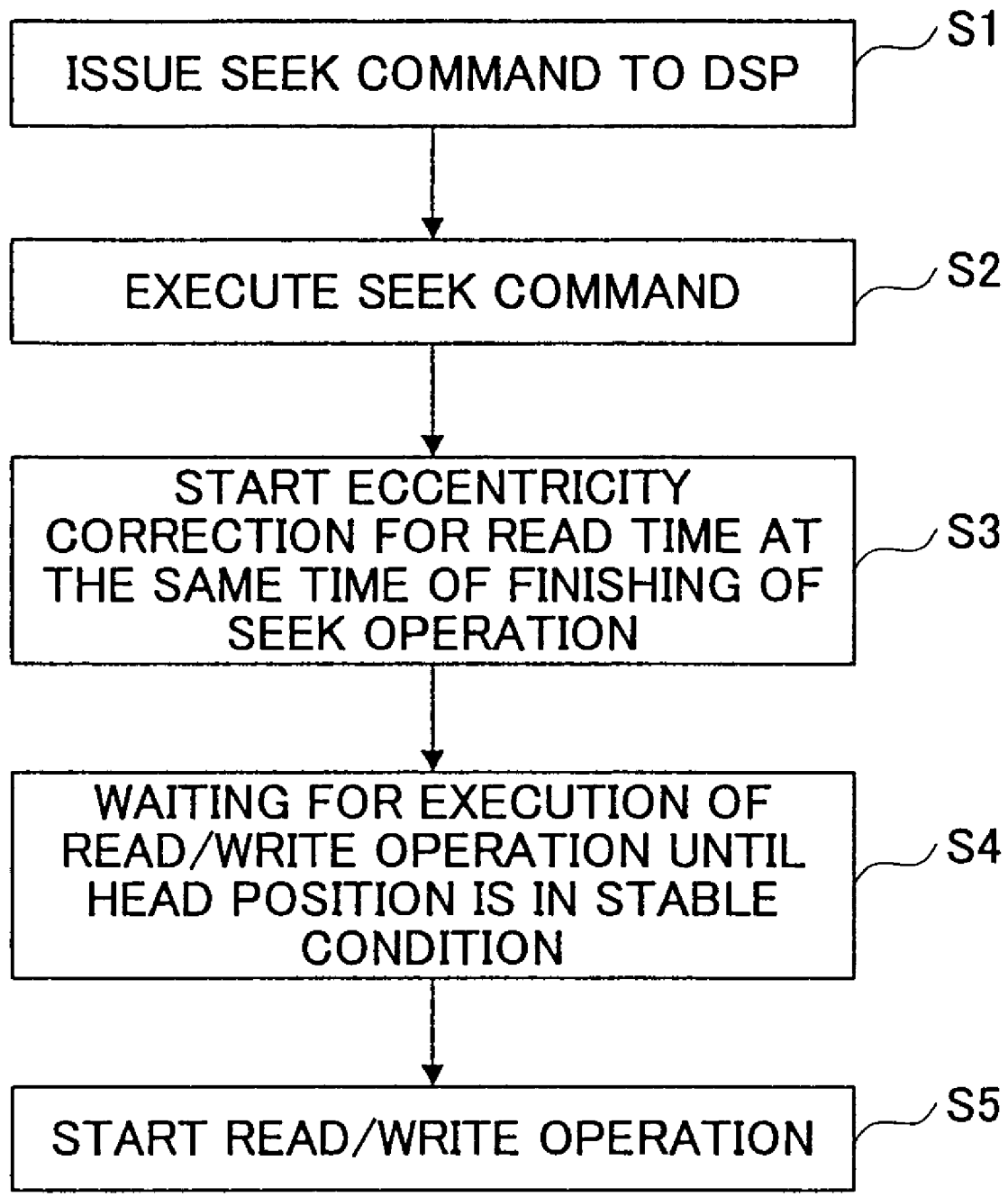
FIG. 3 is a flowchart of an exemplary conventional eccentricity correction method during sequential reading operation.

In the following, embodiments of the present invention will be described with reference to the accompanying drawings.

In one embodiment of the present invention, an initial eccentricity correction table is generated based on servo-demodulated position data of each track of a disk-shaped recording medium. For every cylinder, the initial eccentricity correction table corresponding to the cylinder is generated and recorded in a specified sector of the cylinder. It is noted that eccentricity correction data configuring the initial eccentricity correction table can be found, for example, by using methods disclosed in the above-mentioned Japanese Laid-Open Patent Applications No. 11-232810 and No. 2002-352535. The initial eccentricity correction table can be configured as a table indicative of an initial amount of eccentricity correction of each sector of a corresponding track. However, the present invention is not limited to the table configuration. According to another embodiment of the present invention, the initial eccentricity correction table may be other eccentricity correction data available for the similar purpose. It is noted that the term "initial eccentricity correction amount" is provided on the assumption that the data may be used as an initial eccentricity correction amount and be subsequently updated as needed by DSP corresponding to variations of the eccentricity over time.

In general, an RRO component of each recording and reproducing head, which is used as cylinder eccentricity data, differs from those of other recording and reproducing heads. For this reason, an initial eccentricity correction table should be generated for each recording and reproducing head. In this case, eccentricity correction data can be tabled and recorded in such a way that low-order eccentricity components and high-order eccentricity components can be separated. On the other hand, in another embodiment of the present invention, eccentricity data ranging all order components are integrated, and data indicative of current levels supplied to VCM may be recorded corresponding to the integrated eccentricity. In this embodiment, the data recorded in a medium can be integrated. According to the embodiment, since a single data item can be set for each servo sample, it is possible to correct eccentricity throughout all orders for each servo sample simultaneously.

In a conventional real-time difference computation performed by DSP, if a real-time computed difference is further added to the corresponding initial amount of eccentricity correction as a difference between the initial amount and the current amount, it is possible to make RRO correction more accurate. In this fashion, the eccentricity correction data recorded in a specified sector of a medium may be read sequentially during a write operation. Alternatively, if there is a sector in which an off-track error frequently occurs during a write operation, the eccentricity correction data are read at retrying time for the off-track. Then, in response to a seek instruction, the read eccentricity correction data are delivered from MCU to DSP. As a result, it is possible to perform effective RRO correction by using the eccentricity correction data to control the head position after seeking.

Here, the eccentricity correction data may be recorded in one sector for each cylinder. Alternatively, the eccentricity correction data may be recorded in a plurality of sectors. In this embodiment, it is preferable to record the initial eccentricity correction table in a plurality of sectors.

In general, a large amount of data can be recorded in a disk-shape recording medium. Thus, the initial eccentricity correction table does not have to be recorded in such a way that all-order eccentricity correction data can be integrated and recorded as a single eccentricity correction data set. In another embodiment of the present invention, high-order and low-order eccentricity correction components may be divided for each frequency component and recorded in a medium. Here, it is preferable to record in each cylinder initial eccentricity correction tables on both a cylinder and the next cylinder shifted from the cylinder through a sequential seek operation.

Figure 4:
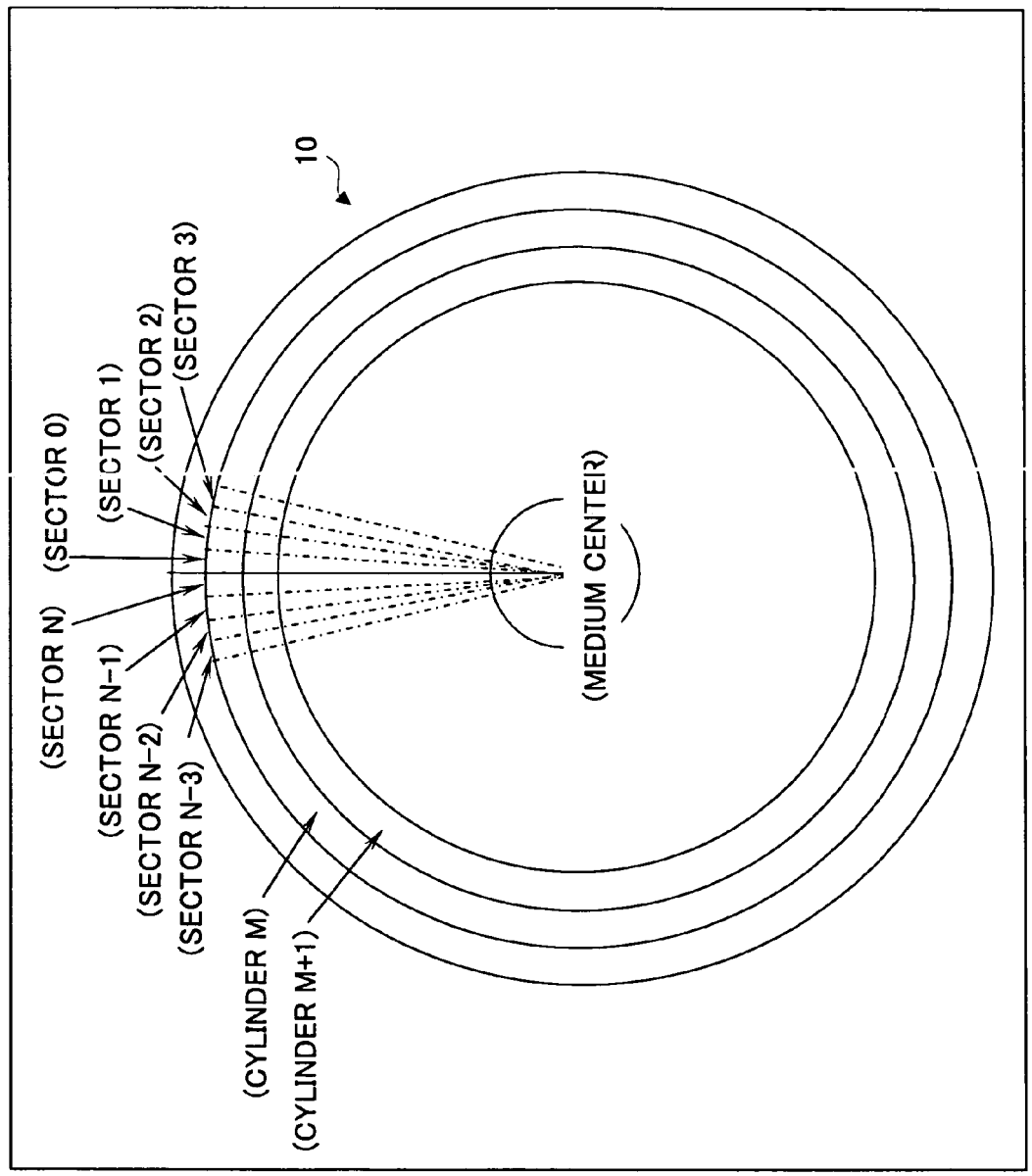
FIG. 4 is a diagram illustrating an exemplary recorded position of an initial eccentricity correction table according to one embodiment of the present invention.

In the embodiment illustrated in FIG. 4, for example, an initial eccentricity correction table on the cylinder M is written in sector 0 through sector 3, and an initial eccentricity correction table on the next cylinder M+1 is written in sector N−3 through sector N. In the illustration, the initial eccentricity correction tables are written in fixed sectors. In accordance with this method, user data cannot be written in certain sectors for writing the initial eccentricity correction table. Thus, a firmware has to be used to perform a sector skip operation to automatically skip the certain sectors. However, user data recorded in an adjacent cylinder cannot be overwritten due to a yaw angle, as described in detail below.

An initial eccentricity correction table on the next cylinder shifted through a sequential seek operation is described. In general, a so-called "yaw angle" between a writing head and a reading head ranges over several cylinders. Accordingly, when a medium is read in a status where a currently written cylinder is on track, data are read from another cylinder different from the currently written cylinder. As a result, the initial eccentricity correction table on the next cylinder for writing user data has to be recorded by offsetting of a predefined number of cylinders from the current cylinder so that the corresponding initial eccentricity correction table can be read at the corresponding cylinder position during the write seek operation. In this fashion, the eccentricity correction data are written in the position offset from the actual cylinder position corresponding to the yaw angle. Thus, it is necessary to additionally record data to indicate which cylinder corresponds to the initial eccentricity correction table, such as data to indicate the corresponding recording and reproducing head or the corresponding cylinder.

In another embodiment of the present invention, an initial eccentricity correction table may be written, rather than in fixed sectors, in a predefined number of sectors beginning with a start sector determined when a format operation is performed on a medium. In this embodiment, an arbitrary position in a cylinder can be set as the start sector, that is, the first logical address of the cylinder. As mentioned above, since the initial eccentricity correction table has to be written in a medium position offset corresponding to the yaw angle, this write operation is performed astride a user data area of an adjacent cylinder. For this reason, it is necessary to skip the corresponding sectors, in which the initial eccentricity correction table has been written, in the cylinder adjacent to the cylinder. In this embodiment, since the initial eccentricity correction table is written in a predefined number of sectors beginning with the start sector in consideration of the yaw angle, the "table read operation" can be smoothly changed into a "user data write operation", as described below with respect to FIG. 12. In a firmware, these sectors are handled as a head skew target during data write operations (see FIG. 12).

A write operation to write an initial eccentricity correction table in a data area immediately after a servo frame according to one embodiment of the present invention is described compared to a conventional write operation to write eccentricity data in a servo frame according to a technique disclosed in Japanese Laid-Open Patent Application No. 09-091903.

Specifically, in accordance with such a conventional write operation, the above-mentioned start sector is determined as an arbitrary position within a track through a medium format operation. Accordingly, the start sector may be determined as a user data area immediately after a servo frame or a user data area in the middle of two servo frames. Then, the initial eccentricity correction table is written in the start sector or in a plurality of successive sectors beginning with the determined start sector.

In either case of the above-mentioned methods, the predefined number of sectors are occupied by data other than user data. As a result, the available recording capacity for user data decreases corresponding to the occupied data, thereby lowering the data transfer speed of the information recording and reproducing apparatus. Also, if retry operations are repeated because of instability of the head position, the performance of the information recording and reproducing apparatus may be further reduced. Thus, it can be concluded that the write operation according to the present invention is more effective than the conventional write operation even if the conventional write operation adopts any of the above-mentioned two methods.

Figure 5:
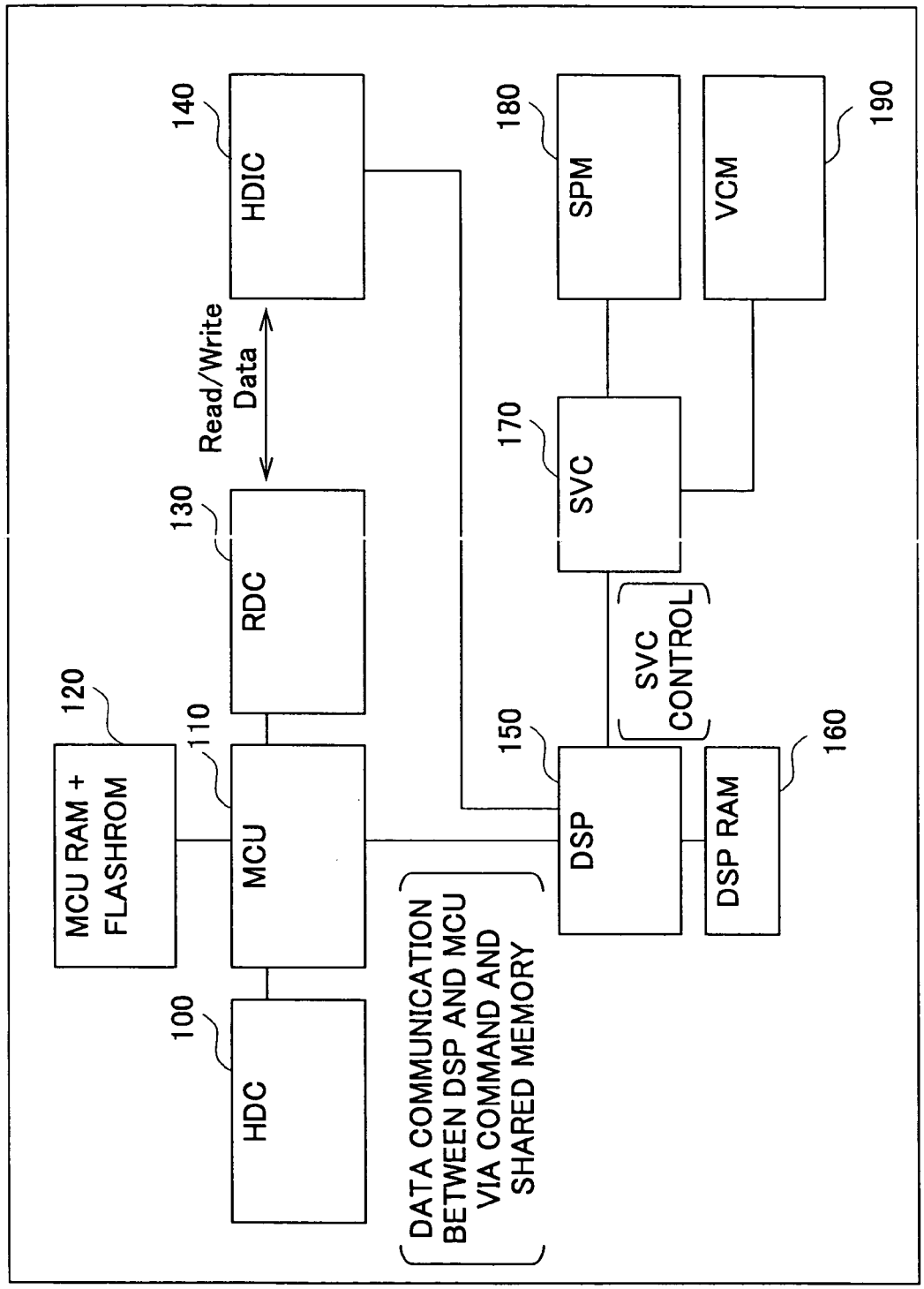
FIG. 5 is a block diagram of exemplary control components of a disk drive apparatus according to one embodiment of the present invention.

FIG. 5 is a block diagram illustrating an exemplary control structure of a magnetic disk drive apparatus according to one embodiment of the present invention.

Referring to FIG. 5, a spindle motor (SPM) 180 rotates a magnetic disk (disk-shaped recording medium) 10. In the example illustrated in FIG. 7, a voice coil motor (VCM) 190 rotationally drives an actuator 30 (see FIG. 7) mounting a magnetic head (recording and reproducing head) 20 in order to shift the magnetic head 20 above cylinders provided in the magnetic disk 10 (seek operation). Here, the recording and reproducing head 20 comprises a write head (W) and a read head (R) (see FIG. 7).

Referring back to FIG. 5, a head IC (HDIC) 140 has various functions to control the magnetic head 20. For example, HDIC 140 serves as a bias current source for a preamplifier (not illustrated), which is to amplify a signal that is being read during data read operations, and the magnetic head 20. Also, HDIC 140 serves as a driver for the magnetic head 20 during data write operations and has a selection function to select a write/read head from a plurality of magnetic heads 20 mounted in the magnetic disk drive apparatus. HDIC 140 corresponds to a head control part to control electrical operations of the magnetic head 20.

A PRML (Partial Response Maximum Likelihood) read channel IC (RDC) 130 decodes an analog data signal supplied from HDIC 140 during data read operations through demodulation in accordance with PRML scheme and then converts the decoded digital data into a parallel signal. On the other hand, RDC 130 encodes and modulates write data during data write operations and then delivers the resulting analog data signal to HDIC 140. RDC 130 corresponds to a data conversion part to convert data read or written from/in the magnetic disk 10.

A digital signal processor (DSP) 150 processes signals required for a servo control system to control the position of the magnetic head 20. Specifically, DSP 150 controls the rotational speed of SPM 180 via a servo control apparatus (SVC) 170 as a motor driver. Also, DSP 150 controls the position of the magnetic head 20 via VCM 190 (seek control or track follow control). DSP 150 corresponds to a head position control part to control the position of the magnetic head 20 on the magnetic disk 10 based on data read from the magnetic disk 10.

A hard disk controller (HDC) 100 is an integrated circuit (IC) to transmit and receive instructions and data to/from a host system of the magnetic disk drive apparatus, such as a computer. HDC 100 receives operation instructions on the magnetic disk drive apparatus from the host system. In this embodiment, it is supposed that a seek request, a read request and a write request are defined as some of such operation instructions in advance. A microprocessor unit (MCU) 110 wholly controls operations of the magnetic disk drive apparatus. A random access memory and a flash EEPROM (Electrically Erasable and Programmable Read Only Memory) MCU RAM+FLASHROM 120 are used as work memories for execution of control operations by MCU 110. In addition, MCU RAM+FLASHROM 120 is used as a storage device to store control programs executed by MCU 110 and characteristic data of the magnetic head 20. DSP-RAM 160 is a work memory used by DSP 150 as needed.

Figure 6:
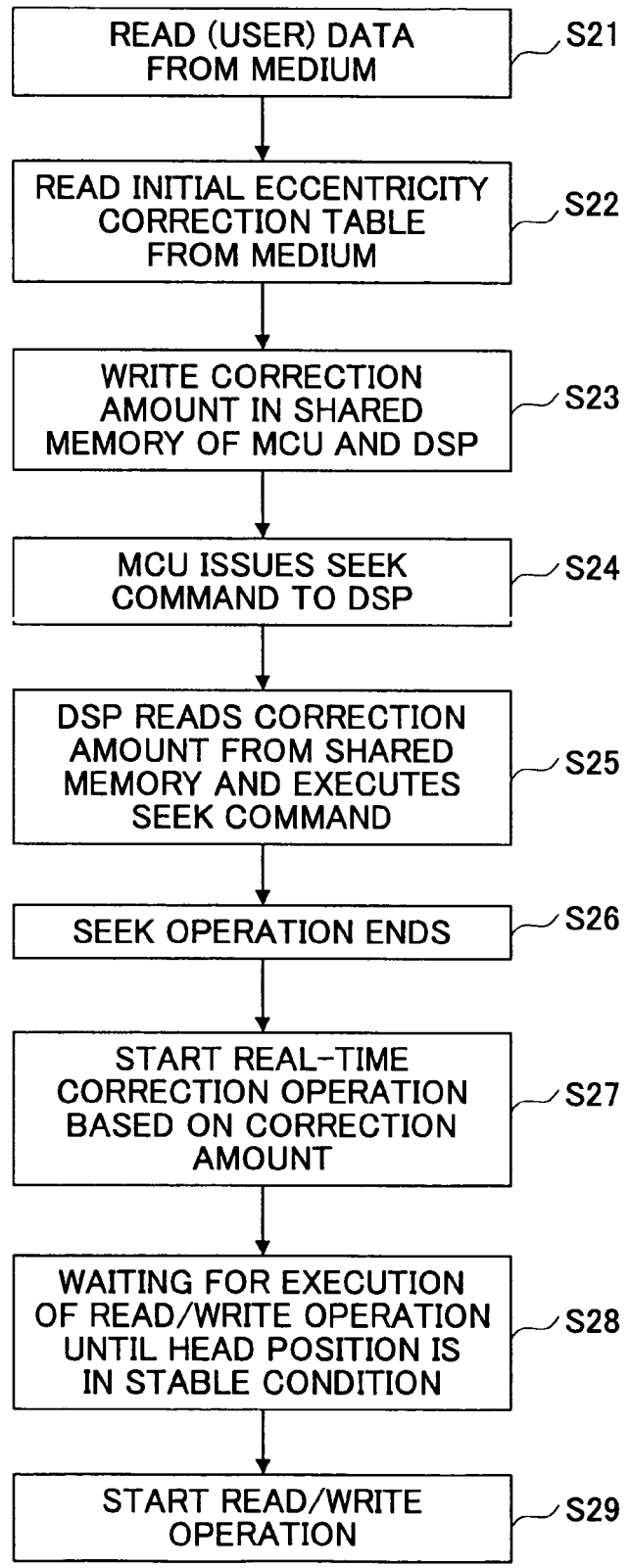
FIG. 6 is a flowchart of an exemplary data read/write operation including an eccentricity correction operation according to one embodiment of the present invention.

A description is given, with reference to FIG. 6, of operations of MCU 110 and DSP 150 on the above-mentioned initial eccentricity correction table according to one embodiment of the present invention.

FIG. 6 is a flowchart of an exemplary data read/write operation including an eccentricity correction operation according to one embodiment of the present invention.

Referring to FIG. 6, user data are read from a medium (magnetic disk) at step S21. When an initial eccentricity correction table is read from the medium at step S22, the correction data are written in a shared memory of MCU 110 and DSP 150 at step S23. When MCU 110 issues a seek instruction to DSP 150 at step S24, DSP 150 reads the written correction data from the shared memory and then executes the issued seek instruction at step S25. After execution of the seek instruction at step S26, DSP 150 corrects the eccentricity based on the eccentricity correction data at step S27. Through this correction, the eccentricity correction operation has been executed. A read/write operation does not start until the correction operation successfully makes the position of the recording and reproducing head stable (step S28). At step S29, after the position of the recording and reproducing head becomes stable, the read/write operation using the recording and reproducing head starts.

According to one aspect of the present invention, in this data read/write operation, the number of process steps increases compared to a conventional case where the initial eccentricity correction table is not used. However, if the initial eccentricity correction table is used, the head position can be effectively stabilized. As a result, it is possible to efficiently reduce not only waiting time before the read/write operation starts but also the number of retry execution times during execution of the read/write operation. In the event, it is possible to improve the performance of the apparatus.

Also, according to one aspect of the present invention, the initial eccentricity correction table does not have to be written in all cylinders of a medium. If it is estimated that a desired phase component of eccentricity correction does not change substantially over some cylinders, the initial eccentricity correction table may be written in a smaller number of cylinders. In this case, it is possible to further shorten the processing time effectively.

Also, according to one aspect of the present invention, since eccentricity correction data can be written as in recording of normal (user) data, an error correction code can be attached to the eccentricity correction data. As a result, it is possible to make the initial eccentricity correction table more reliable.

Judging from the above description, the present invention has some advantages over conventional techniques, that is, an approach of writing eccentricity correction data in a servo frame, as disclosed in Japanese Laid-Open Patent Application No. 09-091903. According to one aspect of the present invention, since eccentricity correction data are written in the step of writing user data, it is possible to effectively save processing time required to write the eccentricity correction data compared to the conventional method.

Conventionally, an area to write eccentricity correction data is prepared regardless of whether the eccentricity correction data are to be recorded in the servo frame. As a result, the apparatus can have a smaller memory capacity to store user data corresponding to the size of the area to write the eccentricity correction data. In order to overcome this problem, there is an approach of using the area to write eccentricity correction data as an area to write user data (user data write area) after setting of the eccentricity correction data write area. In order to adopt this approach, the conventional method disclosed in Japanese Laid-Open Patent Application No. 09-091903 requires re-execution of the above-mentioned servo frame operation in a servo track write (STW) step. On the other hand, according to the present invention, eccentricity correction data are written during operations on a user data area. Accordingly, the present invention can be accommodated to the approach by simply modifying the firmware without execution of the STW step. Therefore, the present invention can easily address the above-mentioned problem compared to the conventional method.

In addition, according to one aspect of the present invention, an arbitrary number of initial eccentricity correction tables can be written. For example, if both eccentricity correction data sets before and after shipment of the apparatus are stored together, it is possible to verify deterioration of the apparatus over time by recalling the used apparatus. Also, the recording format of such eccentricity correction data can be altered easily through a firmware.

In addition, in order to prevent performance reduction due to reading of eccentricity correction data from a medium for each seek operation, an implementation program according to the present invention can be modified so that the inventive operation can be executed only if a certain condition is met. In this case, it is possible to improve the performance of the apparatus under a condition where a sequential write function is applied. If such a sequential write function is applied, adjacent cylinders are successively read and written. Here, as mentioned above, there is a possibility that a cylinder may have a considerably different phase of high-order eccentricity from that of an adjacent cylinder. In this case, the position control of the recording and reproducing head 20 may become instable immediately after seeking. In order to prevent the instability, as mentioned above, it is preferable to record in the last sector of a cylinder an initial eccentricity correction table of the next read/write cylinder. In this case, at the same time when a data read/write operation on the current cylinder is completed, an initial eccentricity correction table for the next cylinder is read and then is delivered to DSP. As a result, DSP can optimally control eccentricity correction for the next cylinder immediately after start of the seek operation on the next cylinder. Accordingly, it is possible to effectively suppress error occurrence at the reading time caused by instability of the head position of the apparatus.

In addition, according to one aspect of the present invention, it is possible to quickly recover from error occurrence during writing time through fewer retry operations. Specifically, when a plurality of write off-track errors occur in a sector, there is a possibility that DSP may currently use inaccurate eccentricity correction amounts. For this reason, the initial eccentricity correction table of the cylinder having the problematic sector is read again, and the initial eccentricity correction table is reset by supplying accurate eccentricity correction data on the problematic sector to DSP. In this fashion, it is possible to effectively suppress error occurrence in the sector. In other words, compared to a conventional case of simply repeating retry operations, it is possible to recover from an error condition more quickly by reading again and updating the initial eccentricity correction table properly.

Figure 7:
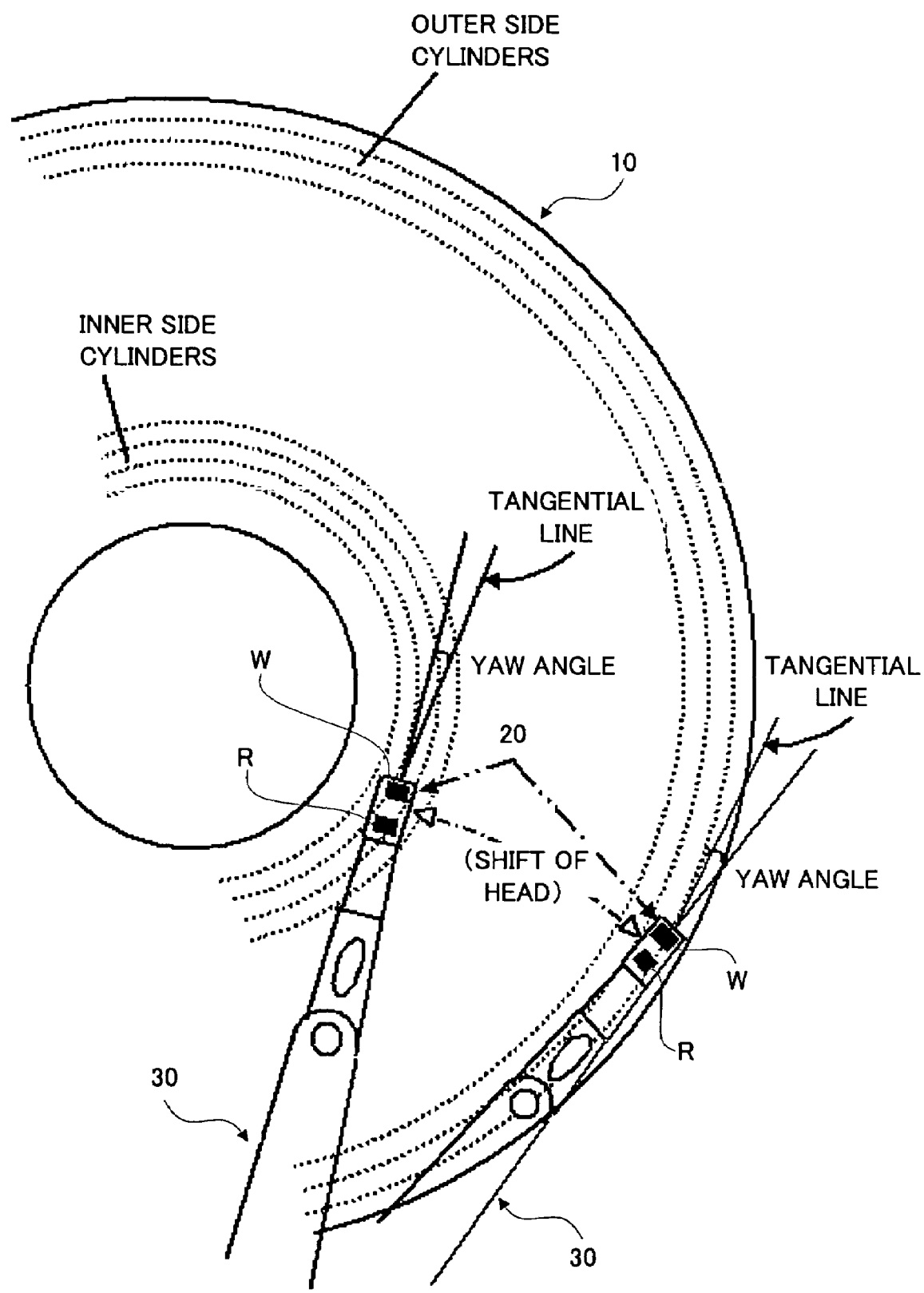
FIG. 7 is a diagram to explain a yaw angle.
Figure 8:
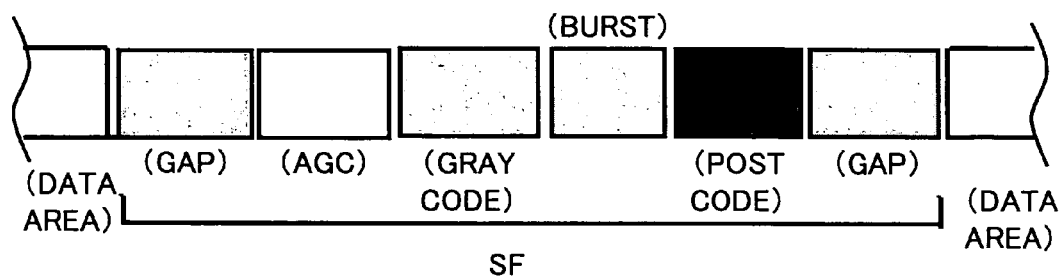
FIG. 8 is a diagram illustrating an exemplary conventional data placement in a servo frame.
Figure 9:
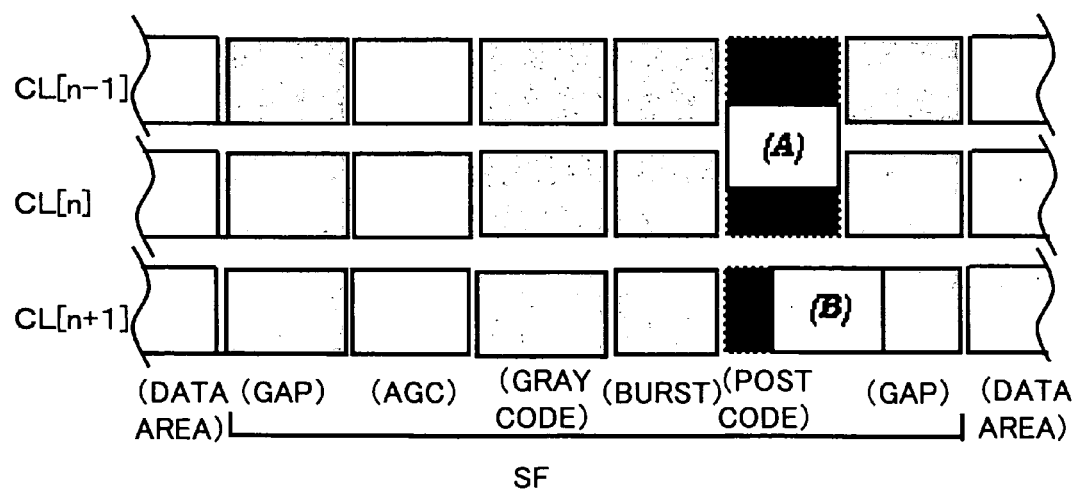
FIG. 9 is a diagram to explain a problem that may occur in a case where eccentricity correction data are written for a conventional structure as shown in FIG. 8.

A detailed description is given, with reference to FIG. 7 through FIG. 9, of the above-mentioned yaw angle.

FIG. 7 shows an exemplary structure of a disk-shaped recording medium (magnetic disk) 10 applicable to one embodiment of the present invention.

Referring to FIG. 7, a large number of cylinders are provided on the disk-shaped recording medium 10 in general, as appreciated by those skilled in the art. However, for convenience, only a few cylinders in an outer circumferential area and an inner circumferential area are illustrated in FIG. 7. It is noted that a yaw angle represents a tilt of the magnetic head 20 to a circumferential (tangential) direction of the magnetic disk 10, as illustrated in FIG. 7. In FIG. 7, the magnetic head 20 is positioned on two spots in the respective outer and inner circumferential areas of the magnetic disk 10. A shown in FIG. 7, a tangential line of a cylinder is set as a reference line. The tilt of the magnetic head 20 is defined as a positive angle in the inner circumferential side, and on the other hand, the tilt is defined as a negative angle in the outer circumferential side.

It will be understood that if the location of the magnetic head 20 is set in the outer circumferential area, the read head R can be positioned at the inner side of the write head W. On the other hand, it will be understood that if the location of the magnetic head 20 is set in the inner circumferential area, the read head R can be positioned at the outer side of the write head W. Thus, if data are read from the outer circumferential area of the magnetic disk 10, the yaw angle is negative. On the other hand, if data are read from the inner circumferential area of the magnetic disk 10, the yaw angle is positive.

FIG. 8 shows an exemplary recording format within the above-mentioned servo frame in the magnetic disk 10.

Referring to FIG. 8, a servo frame SF is read by the magnetic head 20 during operation of the disk drive apparatus. Based on read position information, DSP controls SPM and VCM via SVC so as to control the rotational speed of the magnetic disk 10 and the position of the magnetic head 20 on the magnetic disk 10 via an actuator. It is noted that the position of the magnetic head 20 can be controlled through seek control operation and/or track follow operation.

A "gap" shown in FIG. 8 is defined as an area for providing time to stabilize a signal that is read at the time when data are read from the servo frame SF after writing of data in a "data area". The gap areas, which are provided between data areas to write user data and the servo frame SF, are used to properly read/write user data in accurate sync with a signal written in the servo frame SF.

An automatic gain control (AGC) area is used to adjust the gain of a signal of the servo frame SF during reading of the signal. A "gray code" is information to indicate which head/track the position of the cylinder in question corresponds to. A "burst" area is information to indicate the relative position of the current location of the head to the track center. Here, it is supposed that a recording area to write eccentricity correction data in the servo frame SF in accordance with the conventional technique disclosed in Japanese Laid-Open Patent Application No. 09-091903 is referred to as a "post code area". If such eccentricity correction data are not written as in the above-mentioned conventional method, the post code area may be omitted.

In general, information is written in the servo frame SF in a STW step, and then the written information is not changed. The reason is that once the information written in the servo frame SF is destroyed, the information cannot be restored as long as the STW step is not performed again. In general, it takes a large processing time to perform the STW step. Accordingly, it is necessary to carefully set hardware configuration of STW so that data cannot be erroneously written in a different area (gray code) when information is written in the post code area. In this fashion, destruction of the information in the servo frame SF is prevented.

In this case, data written in the post code area may be misaligned from the center axis of the cylinder as illustrated in (A) in FIG. 9. Also, data may be inaccurately written in the post code area because of erroneous write timing as illustrated in (B) in FIG. 9. In these cases, it is necessary to rewrite the data in the post code area. The example illustrated in (A) in FIG. 9 has a problem, which is caused by the fact that the read head R and the write head W are mounted at different positions on the actuator 30. Namely, it is required that the read head R be always positioned at the cylinder center. Thus, when data are written in the post code area, it is necessary to shift the write head W toward the location of the read head R corresponding to the yaw angle so that the write head W can be positioned at the cylinder center. In this fashion, if the track follow operation is performed by shifting the location of the read head R so as to position the write head W at the cylinder center, there is a likelihood to make the head 20 instable. As a result, there is a risk that data may be written in the post code as illustrated in the example (A). For this reason, it is necessary to check whether data have been properly written in the post code area. In this case, it is estimated that it will take a considerable processing time to execute the write step.

According to one aspect of the present invention, however, since eccentricity correction data can be written as in the normal way to write user data, it can be easily determined that the eccentricity correction data have been properly written if the written data can be read. Thus, the check operation is made easier, and it is possible to shorten the processing time required to write the eccentricity correction data.

Figure 10A:
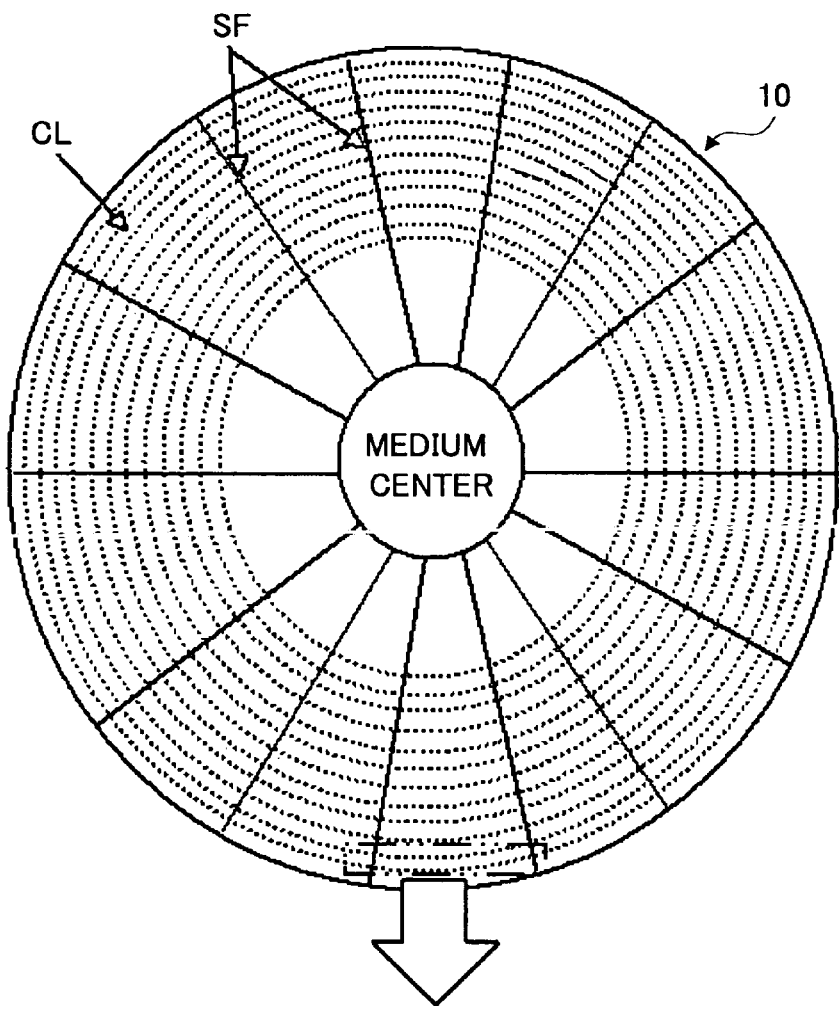
FIGS. 10A and 10B are diagrams to explain an exemplary placement of servo frames in a disk-shaped recording medium.
Figure 10B:
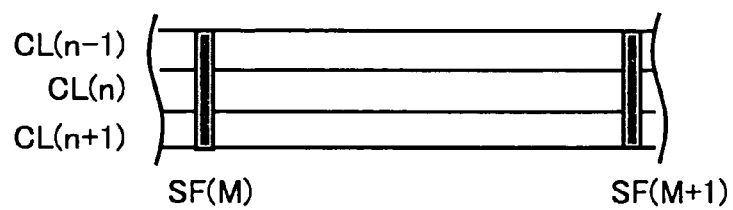
Figure 11:
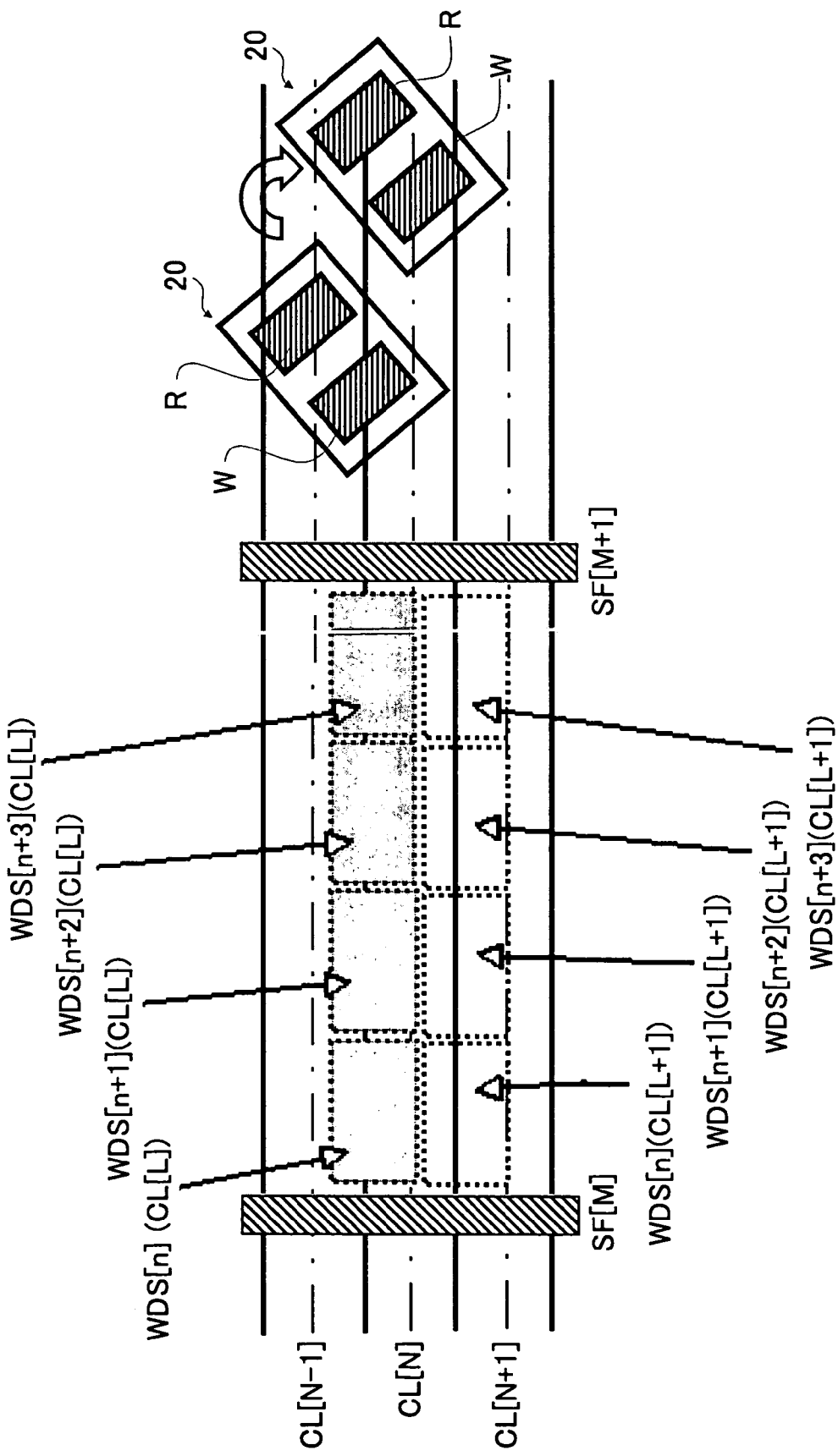
FIG. 11 is a diagram to explain an exemplary relation between positions of tracks of a disk-shaped recording medium and user data write sectors according to one embodiment of the present invention.
Figure 12:
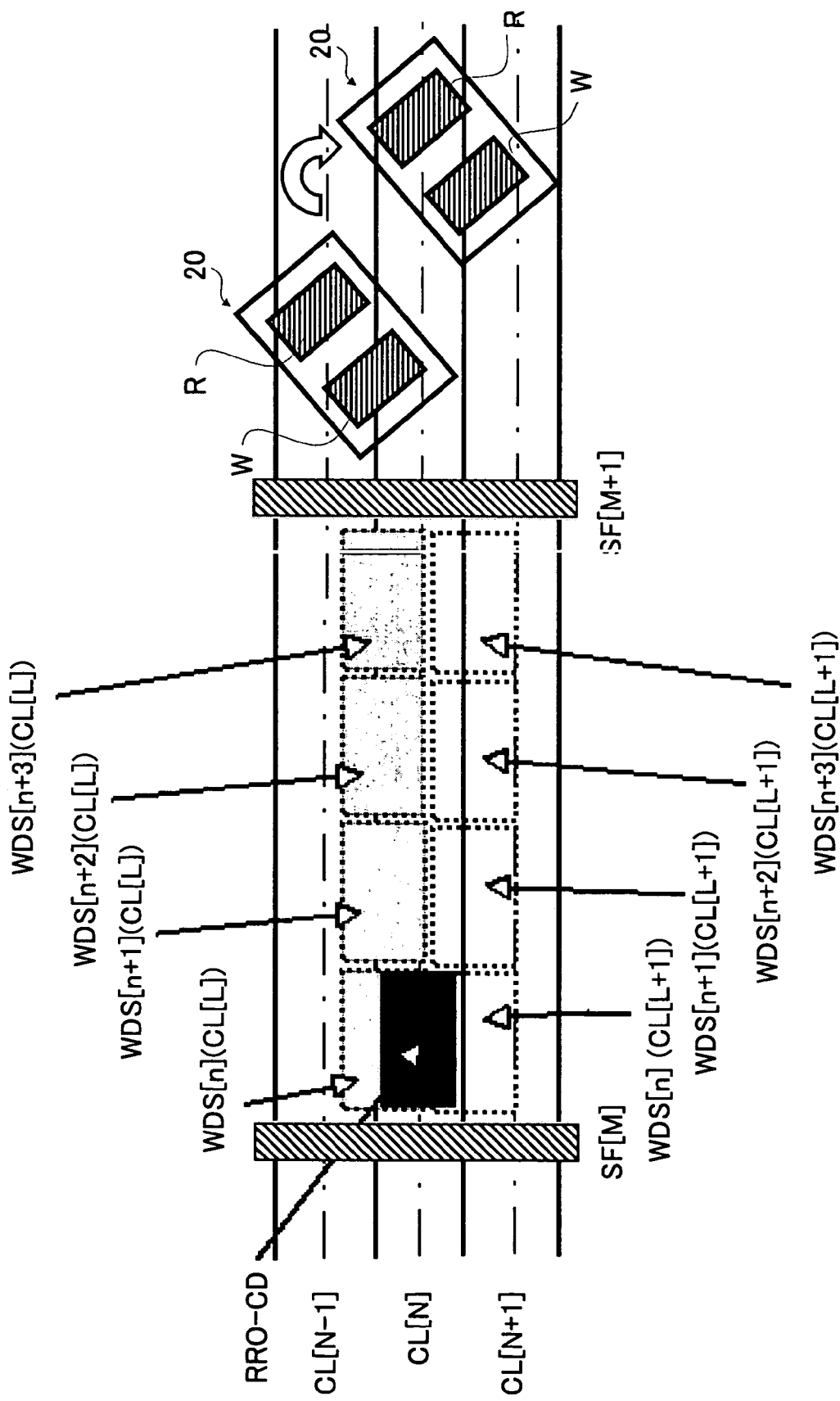
FIG. 12 is a diagram to explain an exemplary write position of an initial eccentricity correction table according to one embodiment of the present invention in association with FIG. 11.

A detailed description is given, with reference to FIG. 10 through FIG. 12, of a write operation to write an initial eccentricity correction table according to one embodiment of the present invention.

FIGS. 10A and 10B are diagrams to explain an exemplary relation between the disk-shaped recording medium 10 in the magnetic disk drive apparatus according to one embodiment of the present invention and cylinders thereof.

Referring to FIGS. 10A and 10B, servo frames SF are provided on the medium 10 radially from the medium center. In each of the servo frames, information as illustrated in FIG. 8 is stored.

FIG. 11 shows an exemplary positional relation between sectors and tracks of (user) data other than the initial eccentricity correction table.

Referring to FIG. 11, as mentioned above, even while the read head R is following a track L (=track[N−1]) at the track center, which is shown as a dot-dashed line, the write head W is positioned on cylinder CL[N]. Thus, user data for the track L are written in track N. Here, it is supposed for convenience that a difference between the read head R and the write head W having a yaw angle is equal to one cylinder. In this case, the track L corresponds to the track[N−1].

Due to the yaw angle, user data are rarely written in just the track center of the track[N], that is, the writing position of the user data is decentered from the track center of the track[N], as illustrated in FIG. 11. Specifically, in the illustrated example, if the read head R follows the track[N−1], user data for the track[N−1] are written in an area (for example, a shaded-area in FIG. 11) ranging the cylinder CL[N] and the cylinder CL[N−1]. Accordingly, for example, in order to read a write data sector WDS[n] of the track L, it is necessary to shift the read head R from the track L (=track[N−1]) to the center of the write data sector WDS[n] in the track[N], as shown by the arrow in FIG. 11. Thus, immediately after data are read from the write data sector WDS[n] of the track L, it is impossible to write-data in the next write data sector WDS[n+1]. In other words, since it takes a processing time to shift the head 20, it is necessary to wait for the next writing operation during one rotation of the medium 10. It is noted that four write data sectors WDS[n] through WDS[n+3] are written within the servo frame SF in the illustration.

FIG. 12 is a diagram illustrating a case of writing an initial eccentricity correction table RRO-CD according to one embodiment of the present invention under the example illustrated in FIG. 11.

Referring to FIG. 12, RRO-CD is written in an area deviated from the write data sector WDS. The reason is that the read head R follows a track at the track center during writing of the corresponding user data. Thus, by reading the initial eccentricity correction data in this condition, it is possible to start to write data immediately after the reading of the initial eccentricity correction data. Specifically, as illustrated in FIG. 12, the head 20 reads RRO-CD in the condition where the read head R is positioned at the center of the cylinder CL[N]. If the head 20 is positioned there, the write head W is positioned on the write data sector WDS of the cylinder CL[L+1]. Thus, data can be written in the write data sector WDS in this situation.

However, since the RRO-CD is also written in a data sector of the adjacent cylinder as illustrated in FIG. 12, the sector is also made unavailable as a user data area. Specifically, the RRO-CD written in the cylinder CL[N] is for eccentricity correction data to be used for writing in a write data sector WDS of the cylinder CL[L+1], as shown in FIG. 12. On the other hand, the RRO-CD for writing data in the write data sector WDS of the cylinder CL[L], which is written in the cylinder CL[N], is used for writing in the cylinder CL[N−1].

In other words, if RRO-CD for writing data in a cylinder is written in advance, another RRO-CD for writing data in the adjacent cylinder is also written in the current cylinder. In this case, the current cylinder includes a sector that the cylinder is not allowed to use. As a result, for each cylinder, the cylinder includes two sectors that the cylinder itself is not allowed to use. However, since a large number of write data sectors WDSs can be set in a single track in general, such slight reduction of the recording capacity would be not significant in terms of the total recording capacity.

Figure 13:
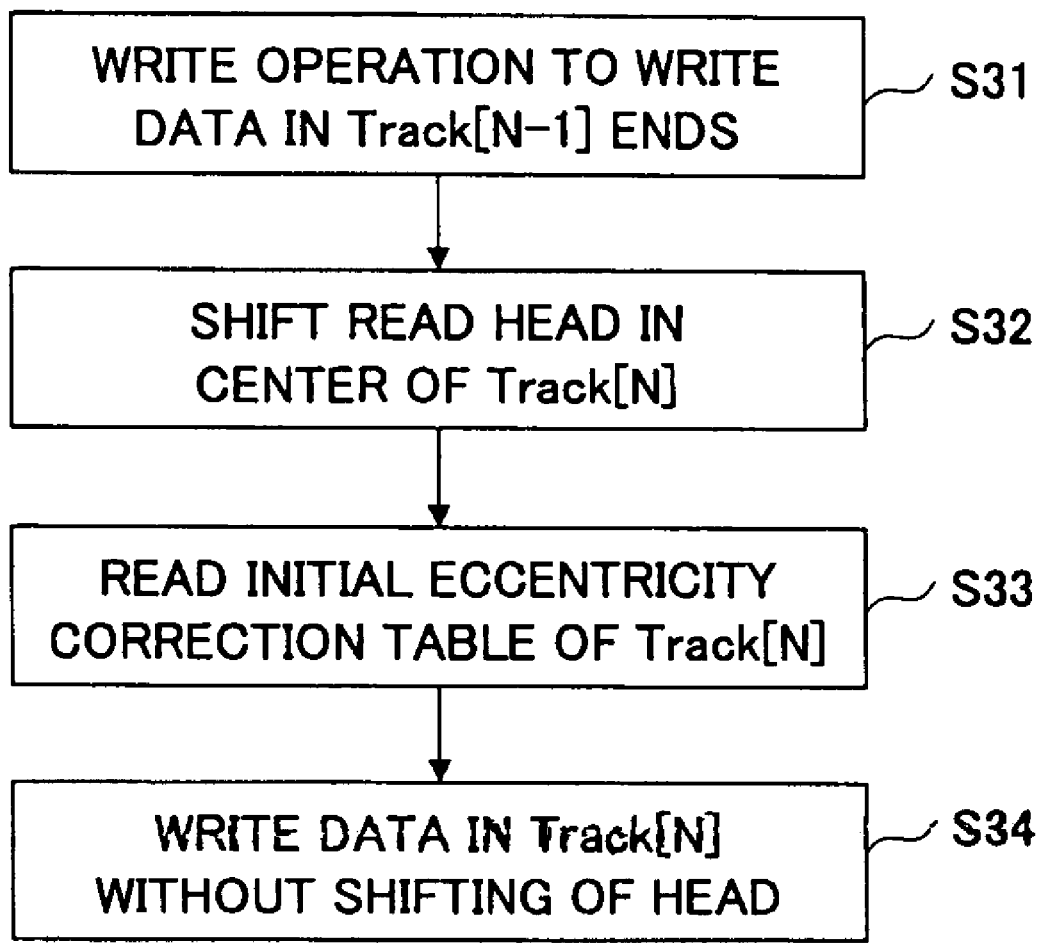
FIG. 13 is a flowchart of an exemplary sequential write operation according to one embodiment of the present invention.

FIG. 13 is a flowchart of an exemplary sequential write operation of a disk drive apparatus according to one embodiment of the present invention.

Referring to FIG. 13, when the disk drive apparatus finishes writing data in the track[N−1] at step S31 (in a status where the read head R of the head 20 is positioned at the center of the cylinder CL[N−1], as illustrated in FIG. 12), the disk drive apparatus shifts the read head R to the center of the next track[N] at step S32 (in a status where the read head R of the head 20 is positioned at the center of the cylinder CL[N]). At step S33, the read head 20 reads an initial eccentricity correction table RRO-CD in the track[N]. At step S34, the disk drive apparatus writes data in the track[N] without shifting of the head 20. In this fashion, the disk drive apparatus can sequentially write data in the medium 10 without waiting for one rotation of the medium 10 after reading of the initial eccentricity correction table RRO-CD.

Figure 14:
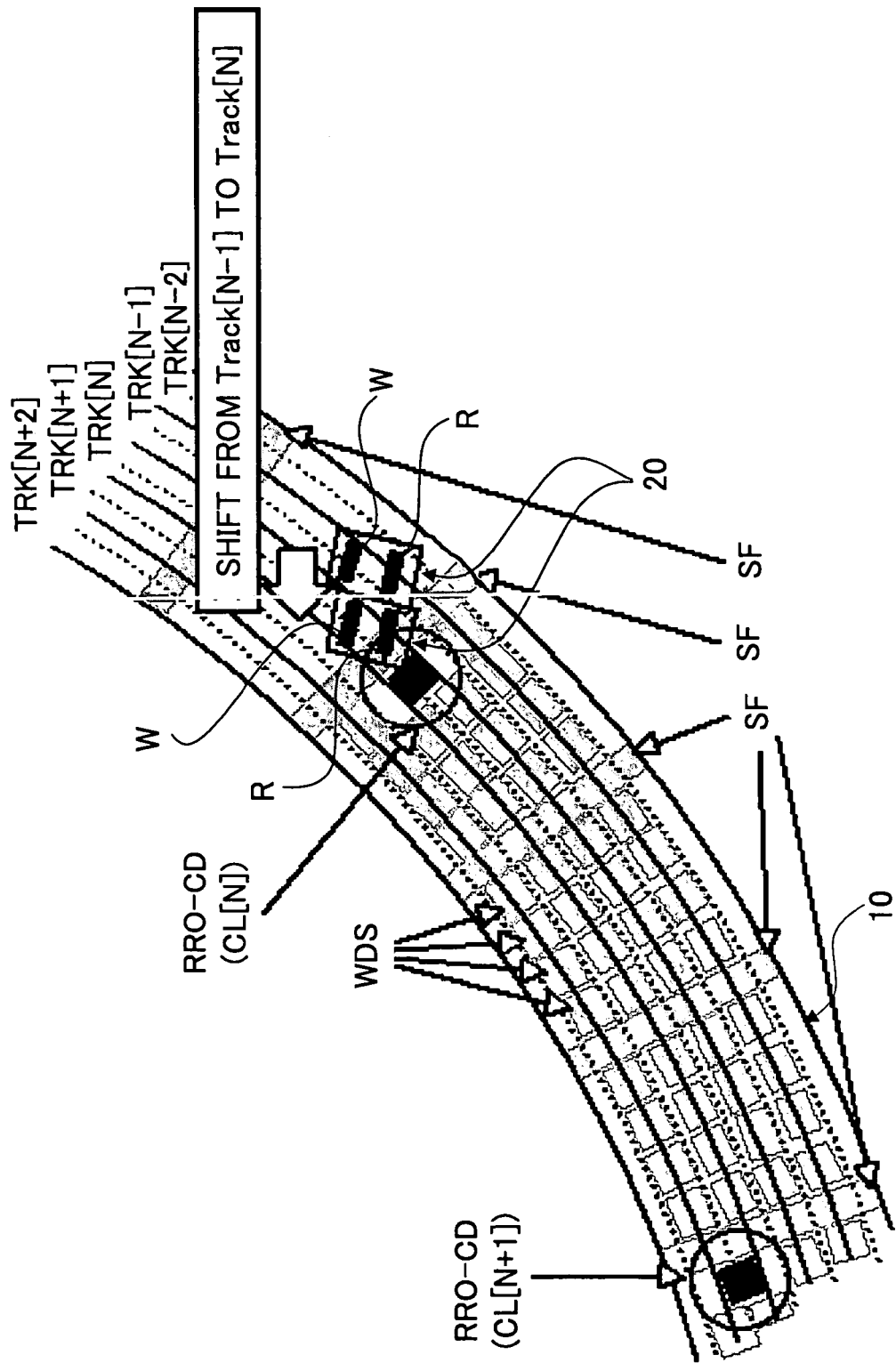
FIG. 14 is another diagram to explain an exemplary write position of an initial eccentricity correction table according to one embodiment of the present invention in association with FIG. 11.

FIG. 14 shows an exemplary wider area of the medium 10. In FIG. 14, two cylinders are illustrated for each side before and after the track[N] on the medium 10.

Referring to FIG. 14, servo frames SF are written in a constant interval on the medium 10, and four write data sectors WDS are inserted between two servo frames SF. In the illustrated example, the medium 10 has to be rotated by at least three servo frames SF for the purpose of shifting from a cylinder to the adjacent cylinder. In FIG. 14, each dot curve represents the center of a track.

In FIG. 14, the track follow operation of the disk drive apparatus are illustrated in two cases: a case where the recording and reproducing head 20 follows the track[N−1] and a case where the recording and reproducing head 20 follows the track [N]. In both cases, the read head R is positioned at the center of each track, as illustrated in FIG. 14. As shown in FIG. 14, there is no write data sector WDS in both sectors adjacent to a sector in which the initial eccentricity correction table RRO-CD for the track[N] is written. Similarly, there is no write data sector WDS in both sectors adjacent to a sector in which the initial eccentricity correction table for the track[N+1] is written.

This implies the following fact. Namely, if an initial eccentricity correction table RRO-CD for writing data in a cylinder is written in advance, another initial eccentricity correction table RRO-CD for writing data in the adjacent cylinder is also written in the cylinder. As a result, sectors that the cylinder itself cannot use are generated in the cylinder. Accordingly, two sectors that cannot be used as user data areas are generated for each sector.

The present invention is not limited to the specifically disclosed embodiments, and variations and modifications may be made without departing from the scope of the present invention.

What is claimed is:

1. A method of recording eccentricity correction data for position control over a recording and reproducing head on a disk-shaped recording medium having at least one user data recording area to record user data, the method comprising the step of:
    recording the eccentricity correction data is recorded in a user data recording area in the same way as writing of the user data but at a location away from the user data recording location corresponding to a yaw angle,
    wherein the way of writing the user data is different from a way of writing servo data.

2. The method as claimed in claim 1, wherein the eccentricity correction data are recorded for all cylinders of the disk-shaped recording medium.

3. The method as claimed in claim 1, wherein the eccentricity correction data are recorded in only predetermined one or more cylinders of the disk-shaped recording medium.

4. The method as claimed in claim 1, wherein the eccentricity correction data are recorded as initial eccentricity correction data, and the initial eccentricity correction data are updated as needed during an operation on the disk-shaped recording medium.

5. The method as claimed in claim 1, wherein the eccentricity correction data are recorded for each frequency component individually.

6. The method as claimed in claim 1, wherein the eccentricity correction data are recorded in one or more sectors for each cylinder.

7. The method as claimed in claim 1, wherein the eccentricity correction data are recorded for each cylinder, and the eccentricity correction data comprise at least one of eccentricity correction data on the cylinder and eccentricity correction data on a next cylinder recorded next to the cylinder in accordance with a sequential recording manner.

8. The method as claimed in claim 1, wherein the eccentricity correction data are recorded in a center area of each cylinder.

9. A method of recording eccentricity correction data for position control over a recording and reproducing head on a disk-shaped recording medium having at least one user recording area to record user data, the method comprising the step of:

controlling the position of a recording and reproducing head when writing the user data in the recording medium based on eccentricity correction data recorded in a user recording area in the same way as writing of the user data but at a location away from the user data recording location corresponding to a yaw angle, wherein the way of writing the user data is different from a way of writing servo data.

10. The method as claimed in claim 9, wherein the eccentricity correction data are recorded in all cylinders of the disk-shaped recording medium.

11. The method as claimed in claim 9, wherein the eccentricity correction data are recorded in only predetermined one or more cylinders of the disk-shaped recording medium.

12. An information recording and reproducing apparatus, comprising:

a disk-shaped recording medium having at least one user data recording area to record user data, the recording medium storing eccentricity correction data in a user data recording area of the recording medium in the same way as writing of the user data but at a location away from the user data recording location corresponding to a yaw angle, wherein the way of writing the user data is different from a way of writing servo data.

* * * * *